3,077,496
PROCESS FOR THE PREPARATION OF
CHRYSANTHEMUMIC ACID
Marc Julia, Paris, France, assignor to Societe des Usines Chimiques Rhone-Poulenc, Paris, France, a French body corporate
No Drawing. Filed June 14, 1961, Ser. No. 116,962
Claims priority, application France June 20, 1960
4 Claims. (Cl. 260—514)

The present invention relates to a new process for the preparation of chrysanthemumic acid (sometimes called chrysanthemic acid).

It is known that certain esters of chrysanthemumic acid, such as pyrethrins, cinerins, allethrins and furethrins, form a very interesting class of insecticides by reason of their great insecticidal activity and their low toxicity to man and cold-blooded animals. It is also known that chrysanthemumic acid has two stereoisomeric forms, cis and trans, and that the esters of the trans acid generally have a higher activity than the derivatives of cis form.

Hitherto, chrysanthemumic acid has been prepared by hydrolysis of rethrins of natural origin, or by the synthesis of Staudinger et al. [Helvetica Chimica Acta (1924) 7, p. 390] further developed by Campbell et al. [J. Chem. Soc. (1945) p. 283] which starts with the reaction of ethyl diazoacetate with 2:5-dimethyl-hexa-2:4-diene and results in a mixture of the (dl) cis and (dl) trans chrysanthemumic acids. This synthesis is difficult to effect by reason of the dangerous instability of ethyl diazoacetate, an instability which renders the industrial application of the aforesaid previously known method of synthesis very complicated. A similar synthesis, in which ethyl diazoacetate is replaced by diazoacetonitrile, gives pure trans chrysanthemumic acid, but even greater care is required during the initial reaction due to the greater instability of the last-mentioned reactant.

A new process for the preparation of trans chrysanthemumic acid has now been found which avoids the use of dangerous reactants. According to the present invention, a process for the preparation of (dl) trans chrysanthemumic acid comprises treating 4-methyl-3-isobutenyl-γ-valerolactone with a hydrogen halide in an alcoholic medium thereby to open the lactone ring, cyclising the resulting alkyl 5-methyl-3-(1-halogenoisopropyl)-hex-4-enoate into a (dl) trans alkyl chrysanthemumate, and converting the ester group of the chrysanthemumate into a carboxylic acid group by saponification.

The opening of the lactone ring of 4-methyl-3-isobutenyl-γ-valerolactone is preferably effected with hydrogen chloride or bromide in methanol or ethanol. The treatment of the lactone with the hydrogen halide may advantageously be preceded by a treatment with thionyl chloride.

For the cyclisation of the alkyl 5-methyl-3-(1-halogenoisopropyl)-hex-4-enoate to obtain a chrysanthemumic ester, an alkali metal alcoholate such as alkali metal t-butylate or t-amylate, more especially sodium t-butylate or t-amylate, may be employed. Other alkali metal reagents such as amides and hydrides (e.g. sodamide and sodium hydride) may also be employed. The cyclisation may be carried out in an aromatic hydrocarbon solvent such as benzene or toluene, or in an N-substituted amide of a lower aliphatic acid, such as N-dimethylformamide or N-dimethylacetamide. Saponification of the chrysanthemumic ester to (dl) trans chrysanthemumic acid is carried out by usual methods.

The cyclisation of the hex-4-enoate to obtain a chrysanthemumic ester and saponification of the ester may be carried out without any special purification of the starting materials.

The sequence of the reactions of the process of the invention may be diagrammatically illustrated as follows:

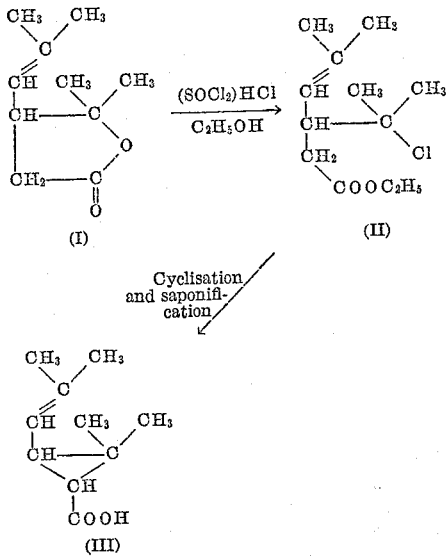

4-methyl-3-isobutenyl-γ-valerolactone (Formula I) employed as starting material in the process of the invention may be prepared by converting 2-methylhex-2-en-5-one into an alkyl 5-methyl-3-acetylhex-4-enoate, treating the hex-4-enoate with a methyl-magnesium halide and hydrolysing the resulting Grignard compound. The conversion of 2-methyl-hex-2-en-5-one into an alkyl 5-methyl-3-acetylhex-4-enoate may be carried out by reacting the hexenone with an appropriate secondary amine, preferably pyrrolidine, condensing the resulting enamine with an alkyl ester of bromoacetic acid, and removing the amine residue from the resulting compound by treatment with aqueous alcohol. The enamine (crude or pure) and alkyl ester of bromoacetic acid are advantageously reacted together in an inert organic solvent, e.g. an aromatic hydrocarbon such as benzene or toluene. Alternatively, the conversion may be carried out by replacing one of the hydrogen atoms in the 4-position of the hexenone by an alkali metal atom by reaction with a suitable reagent such as an alkali metal amide, particularly lithium amide, reacting the alkali metal derivative of the hexenone with bromoacetic acid, and esterifying in manner known per se the resulting 5-methyl-3-acetyl-hex-4-enoic acid.

The following example illustrates the invention.

*Example*

9 g. of 4-methyl-3-isobutenyl-γ-valerolactone (i.e. pyrocin) are treated under reflux for 4 hours in 55 cc. of anhydrous chloroform with 15 cc. of thionyl chloride. The mixture is thereafter cooled and carefully poured into 50 cc. of absolute alcohol saturated with dry hydrogen chloride. The reaction mixture is left for 2 hours at room temperature, the volatile products are then driven off and the residue is distilled. There are collected 10.2 g. of crude ethyl 5-methyl-3-(1-chloroisopropyl)hex-4-enoate, $n_D^{21}$=1.4648, B.P.=89–118° C./0.6 mm. Hg.

This crude product is cyclised by addition of 40 cc. of sodium t-amylate (a 1.7 N solution in benzene). The addition takes place in the cold, and an exothermic reaction occurs. The reaction mixture is left overnight, and then boiled under reflux for 2 hours. After cooling, it is dropped onto iced water and extracted with diethyl ether. The ethereal extracts, after having been washed with water saturated with sodium chloride, are dried over sulphate, the solvent is evaporated and the residue is distilled. There are thus obtained 3.6 g. of a product distilling at 112–120° C. under 17 mm. Hg and having a refractive index $n_D^{18}=1.4610$ comparable to (dl) trans ethyl chrysanthemumate described by I. G. M. Campbell [J. Chem. Society (1945), 283].

On saponification of this ester with 1.4 g. of potassium hydroxide in 15 cc. of alcohol at the boiling point of the mixture for 2 hours, the corresponding acid is liberated, this acid being identical to an authentic specimen of (dl) trans chrysanthemumic acid (2:2-dimethyl-3-isobutenylcyclopropanecarboxylic acid).

4-methyl-3-isobutenyl-γ-valerolactone employed as starting material may be prepared as follows:

In a spherical flask provided with a water separator, 40 g. of isobutylidene acetone (prepared in accordance with R. Heilmann et al., Bulletin de la Soc. Chim. de France (1957) p. 115) are boiled under reflux for one night with 78.1 g. of anhydrous pyrrolidine and 250 cc. of dry benzene. 7.5 cc. of water are collected. On the following day, the volatile products are driven off in vacuo, 50 cc. of anhydrous benzene are added and then without cooling 55 cc. of ethyl bromacetate in 50 cc. of benzene. The reaction mixture gradually gets hotter and reflux commences at the end of the addition. The reflux is maintained by heating for 6 to 8 hours. The benzene is then driven off under reduced pressure and 200 cc. of 80% aqueous methanol are added in one lot. The reaction mixture is thereafter boiled under reflux for 4 hours, the methanol is driven off in vacuo, the brown residue is dropped into 250 cc. of cold water and the product is extracted by washing with diethyl ether. The ethereal extracts are successively washed with 2 N sulphuric acid, a saturated aqueous solution of sodium bicarbonate and water, and are dried over sodium sulphate.

After evaporation of the diethyl ether, the product is distilled and 31 g. of slightly coloured ethyl 5-methyl-3-acetyl-hex-4-enoate, B.P.=110–116° C./9 mm. Hg, are obtained. Redistillation under nitrogen gives a colourless oil, B.P. 68–72° C./0.2 mm. Hg.

Methylmagnesium iodide is prepared (using 1.44 g. of magnesium and 8.52 g. of methyl iodide) in 75 cc. of anhydrous diethyl ether. When the reaction is complete, diethyl ether (50 cc.) is driven off and replaced by an equal volume of dry benzene. The solution thus obtained is added to 10 g. of the ethyl 5-methyl-3-acetyl-hex-4-enoate (prepared as described above) in solution in 50 cc. of anhyrous benzene, the temperature being maintained between $-2°$ and $+1°$ C. The reaction mixture is then allowed to return in 1 hour to ambient temperature. The product is hydrolysed with an iced saturated solution of ammonium sulphate, extracted with diethyl ether, washed with a saturated solution of sodium chloride and dried over sodium sulphate. The solvent is evaporated and 7 g. (87%) of a colourless oil distil, which oil soon sets B.P.=70–71° C./0.2 mm. Hg; M.P.= 52–53° C. On recrystallisation from petroleum ether B.P.=35–50° C.), (±) pyrocin is obtained in the form of white crystals, M.P.=57–58° C., which melting point is not depressed by mixing with authentic (±) pyrocin (M.P.=56–57° C.) prepared in accordance with Harper and Crombid by pyrolysis of chrysanthemumic acid [J. Sc. Food. Agr. 2 (1951), 421].

The I.R. spectra of the two products are identical.

An alternative method for preparing 5-methyl-3-acetyl-hex-4-enoate (referred to above) is as follows:

1.5 mole of lithium amide is prepared from 11 g. of lithium and 1500 cc. of liquid ammonia, and then 112 g. of 2-methyl-hex-2-en-5-one in 500 cc. of anhydrous diethyl ether are added. The mixture is allowed to stand overnight at $-35°$ C., 500 cc. of anhydrous ether are added and the ammonia is evaporated. When the evaporation is complete, the mixture is cooled to about 0° C. by an ice and salt bath, and 70 g. of bromacetic acid dissolved in 500 cc. of anhydrous diethyl ether are slowly added. When the addition is complete, the reaction mixture is maintained under reflux for 12 hours with stirring; it is then hydrolysed by means of a saturated solution of ammonium chloride. The ethereal layer is collected and the mother liquors washed with 2 x 100 cc. of diethyl ether. The mother liquors are then acidified to pH 1 and again extracted with diethyl ether. The ethereal extracts are washed with a saturated sodium chloride solution and dried over sodium sulphate. Evaporation of the solvent leaves 60 g. of a brown oil containing 5-methyl-3-acetyl-hex-4-enoic acid. A distilled fraction, B.P.=114–118° C./0.2 mm. Hg, gave a semi-carbazone, which on recrystallisation from methanol, melted at 192–194° C. (decomp.).

Analysis.—$C_{10}H_{17}O_3N_3$—Calc. percent: C, 52.85; H, 7.54; N. 18.49. Found, percent: C. 53.33; H, 7.72; N, 18.20.

56. g. of 5-methyl-3-acetyl-hex-4-enoic acid (crude product) are refluxed for 15 hours in an apparatus provided with a water separator with 150 cc. of absolute alcohol, 150 cc. of anhydrous benzene and 0.4 cc. of concentrated sulphuric acid. The greater part of the solvents is thereafter driven off and 200 cc. of water saturated with sodium chloride are added. The product is carefully extracted with diethyl ether, and then the ethereal extracts are washed first with a sodium bicarbonate solution and then with water, and dried over sodium sulphate. The solvents are evaporated and 30 g. of colourless ethyl 5-methyl-3-acetyl-hex-4-enoate are distilled.

I claim:

1. Process for the preparation of (dl) trans chrysanthemumic acid which comprises treating 4-methyl-3-isobutenyl-γ-valerolactone with a hydrogen halide in a medium selected from the group consisting of methanol and ethanol thereby to open the lactone ring, cyclising the resulting alkyl 5-methyl-3-(1-halogenoisopropyl)hex-4-enoate into a (dl) trans alkyl chrysanthemumate by treatment with a reagent selected from the class consisting of alkali metal t-butylates and t-amylates, alkali metal amides and alkali metal hydrides, and converting the ester group of the chrysanthemumate into a carboxylic acid group of the chrystanthemumate into a carboxylic acid.

2. Process for the preparation of (dl) trans chrysanthemumic acid which comprises treating 4-methyl-3-isobutenyl-γ-valerolactone with a hydrogen halide selected from the class consisting of hydrogen chloride and hydrogen bromide, in a medium selected from the class consisting of methanol and ethanol thereby to open the lactone ring, cyclising the resulting alkyl 5-methyl-3-(1-halogenoisopropyl)hex-4-enoate into a (dl) trans alkyl chrysanthemumate by treatment with a reagent selected from the class consisting of alkali metal t-butylate and t-amylate, alkali metal amides and alkali metal hydrides, and converting the ester group of the chrysanthemumate into a carboxylic acid group by saponification.

3. Process for the preparation of (dl) trans chrysanthemumic acid which comprises treating 4-methyl-3-isobutenyl-γ-valerolactone with a hydrogen halide in a medium selected from the class consisting of methanol and ethanol thereby to open the lactone ring, cyclising the resulting alkyl 5-methyl-3-(1-halogenoisopropyl)hex-4-enoate into a (dl) trans alkyl chrysanthemumate by treatment with a reagent selected from the class consisting of alkali metal t-butylate and t-amylate, alkali metal amides and alkali metal hydrides in a medium selected from the class consisting of benzene, toluene, N-dimethylformamide and N-dimethyl acetamide, and converting the ester group of the chrysanthemumate into a carboxylic acid group by saponification.

4. Process for the preparation of (dl) trans chrysanthemumic acid which comprises treating 4-methyl-3-isobutenyl-γ-valerolactone with a solution of thionyl chloride in anhydrous chloroform, and then with dry hyrdogen chloride in absolute ethanol thereby to open the lactone ring, cyclising the resulting ethyl 5-methyl-3-(1-chloroisopropyl)hex-4-enoate into (dl) trans ethyl chrysanthemumate by treatment with a solution of sodium t-amylate in benzene, and converting the ester group of the chrysanthemumate into a carboxylic acid group by saponification with potassium hydroxide.

References Cited in the file of this patent

UNITED STATES PATENTS 2,815,362  Harper ---------------- Dec. 3, 1957

3,009,946  Takei et al. ------------- Nov. 21, 1961

FOREIGN PATENTS 1,203,902  France ---------------- Aug. 3, 1959